United States Patent
Breimesser et al.

(10) Patent No.: US 8,085,248 B2
(45) Date of Patent: Dec. 27, 2011

(54) ELEMENT FOR A CONTROL PANEL OF A DEVICE

(75) Inventors: Fritz Breimesser, Nürnberg (DE); Jörg Hassel, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 826 days.

(21) Appl. No.: 11/665,867

(22) PCT Filed: Oct. 10, 2005

(86) PCT No.: PCT/EP2005/055126
§ 371 (c)(1),
(2), (4) Date: Apr. 19, 2007

(87) PCT Pub. No.: WO2006/042804
PCT Pub. Date: Apr. 27, 2006

(65) Prior Publication Data
US 2009/0062938 A1    Mar. 5, 2009

(30) Foreign Application Priority Data
Oct. 19, 2004    (DE) .......................... 10 2004 050 907

(51) Int. Cl.
*G06F 3/041*    (2006.01)
(52) U.S. Cl. .......................................... 345/173; 345/30

(58) Field of Classification Search .......... 345/695–698, 345/214, 31, 39, 111, 204, 173
See application file for complete search history.

(56) References Cited

U.S. PATENT DOCUMENTS

| | | | |
|---|---|---|---|
| 4,551,717 A | 11/1985 | Dreher | |
| 6,252,564 B1 | 6/2001 | Albert et al. | |
| 2003/0082889 A1* | 5/2003 | Maruyama et al. | 438/455 |
| 2003/0151600 A1* | 8/2003 | Takeuchi et al. | 345/204 |
| 2003/0160739 A1* | 8/2003 | Silic | 345/30 |
| 2004/0056781 A1* | 3/2004 | Rix et al. | 341/20 |

FOREIGN PATENT DOCUMENTS

| | | |
|---|---|---|
| DE | 103 34 516 A1 | 3/2005 |
| EP | 1 345 116 A | 9/2003 |
| WO | WO 00/08531 | 2/2000 |
| WO | WO 01/69366 A2 | 9/2001 |
| WO | WO 2004/027558 A2 | 4/2004 |

* cited by examiner

*Primary Examiner* — Kevin M Nguyen
*Assistant Examiner* — Christopher E Leiby

(57) ABSTRACT

There is described a design element for a control panel of a device and further a device having a plurality of design elements that can be freely positioned on a control panel, and to a method for configuring such a device and a corresponding computer program. An aim is to provide a control panel which is extremely flexible in its handling. For this purpose, individual design elements are freely positioned on a control panel. Power supply and data transmission to a control module are carried out in a contactless manner. The design elements are preferably printed polymer electronic components having their own electronics.

15 Claims, 4 Drawing Sheets

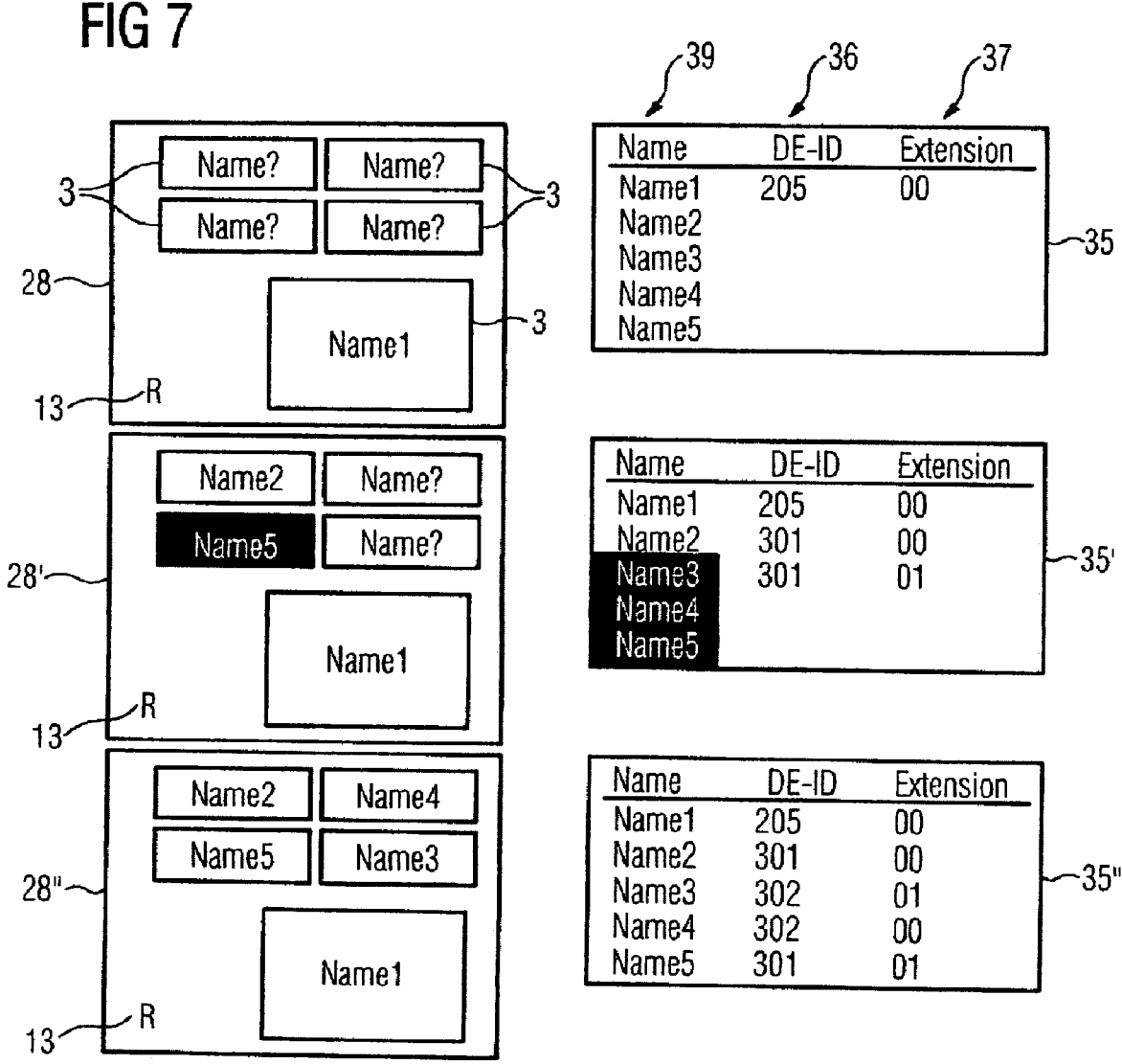

ELEMENT FOR A CONTROL PANEL OF A DEVICE

CROSS REFERENCE TO RELATED APPLICATIONS

This application is the US National Stage of International Application No. PCT/EP2005/055126, filed Oct. 10, 2005 and claims the benefit thereof. The International Application claims the benefits of German application No. 10 2004 050 907.7 DE filed Oct. 19, 2004, both of the applications are incorporated by reference herein in their entirety.

FIELD OF INVENTION

The present invention relates to a design element for a control panel of a device. The invention also relates to a device with a number of design elements disposed on a carrier element, a device with a number of design elements than can be positioned freely on a control panel and a method for configuring such a device and a corresponding computer program.

BACKGROUND OF INVENTION

Control or operator panels for devices in the field of automation are known, which operate as man-machine interfaces. The appearance and functionality of such control panels are permanently defined at the time of production. A control panel for example thus comprises a number of display elements and a number of operating elements, for example push buttons.

SUMMARY OF INVENTION

It is an object of the present invention to provide a device with a control panel that can be handled in a particularly flexible manner. This object is achieved by the objects to be protected set out in the independent claims.

In so doing a core concept of the invention is to position individual design elements freely on a control panel. The design elements here can be elements with a display function, elements with an operating function or elements with both a design and operating function. An operating function here refers in particular to an input or other switching function.

Each design element has its own control and communication unit. The communication unit here is preferably configured for wireless communication, in such a manner that a data transmission to the control panel is ensured with free positioning. Each design element also has a unique identifier, which identifies the function of the design element and can be used to address the design element on the control panel. The identifiers of the individual design elements serve during the configuration of the control panel to address the design elements, in such a manner that every design element on the control panel is identified and corresponding addressing information is specified.

Reconfiguring the control panel allows its design to be modified at any time. An application-specific design is equally possible, in that new design elements are positioned on the control panel. It is advantageous in this context, if the design elements can be added to the control panel in a removable manner. The control panel itself is connected to a control and communication module, which provides the data transmission to the design elements.

It is also particularly advantageous, if a contactless power supply is provided to the individual design elements on the control panel. Complex cabling of the individual design elements is then not necessary. An inductive power supply is particularly advantageous because of is comparatively simple embodiment. Other technologies that can be used are based on radio wave or infrared wave transmission.

The components provided for communication between the design elements and the control module of the control panel are configured for contactless data transmission, such that even comparatively large quantities of data can be transmitted quickly and reliably. The data is preferably transmitted using a particularly fast and reliable technology, in particular a high-frequency method.

It is of course also possible to provide a common transmission link for a combined power and data transmission. Fewer components are then necessary, reducing the installation space requirement.

According to a further advantageous embodiment of the invention the design element has an operating element, for example in the form of a touch-sensitive element or push button. This allows manual operation of each individual design element, which is particularly useful for configuration purposes.

The design elements are preferably executed by way of polymer electronic systems. Compared with complex coating or etching methods based on conventional semiconductors, such electronic components can be created using relatively simple printing methods. Printing a number of design elements onto a carrier element, for example in the form of a flexible film (panel), using screen, pad, offset, intaglio or ink-jet printing or microcontact printing, ensures low-cost mass production. The design elements are thereby disposed in lines and columns, in the nature of a matrix, on the carrier element and can be removed, in particular cut out, from said carrier element individually or in groups.

Each individual design element, which is fully functional and preferably hermetically sealed per se, can thus be removed from such a panel and positioned on a control panel, for example using adhesive. Adhesion methods or any other connecting methods, which have sufficient connective strength for the respective purpose, can be used for this. Detachable connections are thereby preferably used, so that the individual design elements can be removed quickly and simply from the control panel, if the control panel layout changes, for example due to a new machine component, or if a design element has to be replaced due to a defect, etc. or for maintenance purposes. When the design elements have been positioned, a configuration method is implemented, wherein the individual design elements are assigned to their functions on the control panel. An initialization preferably takes place first, whereby it is determined how many design elements there are on the control panel. This is followed by the address assignment required for operation for each individual design element. It is most particularly advantageous for a particularly simple configuration, if both the control panel and each design element have at least one separate input device, preferably a touch-sensitive region, for inputting commands for the configuration process.

The present invention provides a control panel, for example for an automation device, a mobile telephone or another device for private or industrial use, which can be operated in the manner of a server in a wireless local network. The control panel thereby communicates with the design elements, which serve as clients. When addressing the design elements and implementing the data transmission, technologies and protocols known from conventional, preferably wireless networks, such as WLAN or Bluetooth, are preferably used.

BRIEF DESCRIPTION OF THE DRAWINGS

The invention is explained in more detail below based on exemplary embodiments, which are described with the aid of the figures, in which:

FIG. 7 shows a symbolic representation of a control panel and the content of a configuration table during the configuration process.

DETAILED DESCRIPTION OF INVENTION

Figure 1:
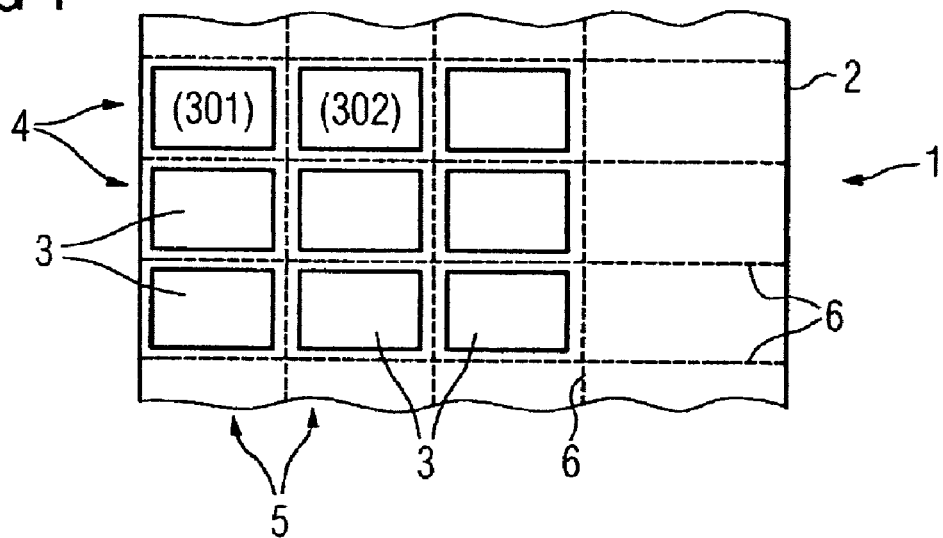
FIG. 1 shows a carrier element printed with design elements.

FIG. 1 shows a section of a roll or web 1, essentially comprising a carrier film 2, with design elements 3 printed on using polymer electronic systems and disposed in lines 4 and columns 5. Between the individual design elements 3 horizontally and vertically disposed, in some instances prepunched, cutting or separating lines 6 are provided, at which design elements 3 can be cut or removed from the carrier film 2 individually or in groups. Each design element 3 has a three-part identifier in the form "XYZ". This comprises on the one hand a function code "X" and on the other hand a column number "YZ". The function code "X" indicates whether the design element 3 is a display element or an operating element or an element with both display and operating functions. The column number "YZ" indicates the position of the design element 3 on the carrier film 2. Preferably only design elements 3 with identical function codes "X" are positioned on a carrier film 2. In the example a carrier film 2 with design elements 3 having only display functions is shown. The function code "3" for example is assigned to such design elements. According to the position of each design element 3 on the carrier film 2, the identifier of the upper left design element is "301" and the identifier of the design element disposed to the right of that is "302". Both identifiers are shown symbolically in FIG. 1. As an alternative to this embodiment of the identifier, a continuous serial number, etc. can also be used. In this instance the function code would be used as part of the serial number. It is important when assigning the identifier that the original position of the design elements 3 on the carrier film 2 can be tracked.

Figure 2:
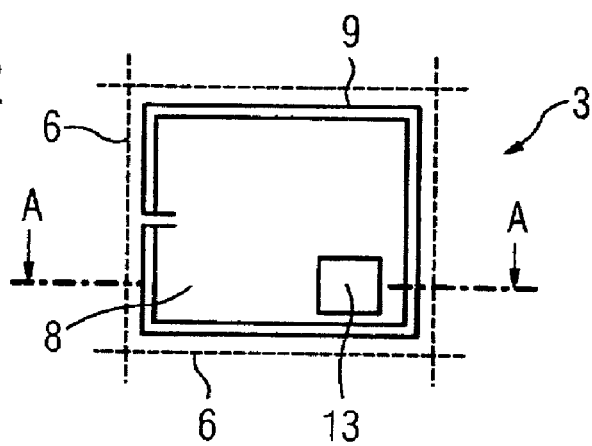
FIG. 2 shows a simplified diagram of a design element viewed from above.

An individual design element 3 with a display function is shown viewed from above in FIG. 2. The inner region 8 of the design element 3 is thereby enclosed by a peripheral electric line arrangement 9, used for the inductive power supply to the design element 3.

Figure 3:
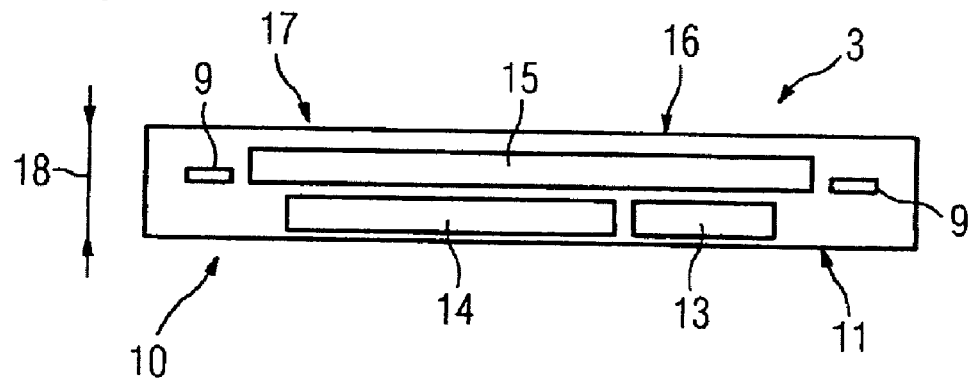
FIG. 3 shows a simplified diagram of a design element in cross section.

As shown in the sectional diagram in FIG. 3, the design element 3 is structured in layers. The lower or rear side 10 of the design element 3 is thereby formed by a rear cover 11. The rear cover 11 is provided with an adhesive component (not shown), so that the design element 3 can be removed from the carrier film 2 (not shown in FIG. 3) and attached to a control panel. Above the rear cover 11 in a first situation is a touch-sensitive element 13, which preferably serves to operate the design element 3 during its configuration, to confirm messages or to switch the display mode, as well as various electronic components 14. These components are covered by a layer-type display unit 15, which comprises a number of display elements (not shown), for example organic light-emitting diodes (OLEDs), and serves as a display unit. A transparent front cover 16 seals the front or upper side 17 of the design element 3 in such a manner that light emitted from the display unit 15 cannot penetrate outward. The rear cover 11 and front cover 16 enclose the design element 3, which only has an overall height 18 of a few millimeters, in a hermetic manner, thereby ensuring reliable function even in the most problematic industrial conditions of use. All the components of the design element are preferably executed using polymer electronic systems. If the design element 3 is configured for operating purposes and therefore has operating elements, either exclusively or in addition to the display elements, for example push buttons, switches, etc., these components are also preferably executed using polymer electronic systems.

Figure 4:
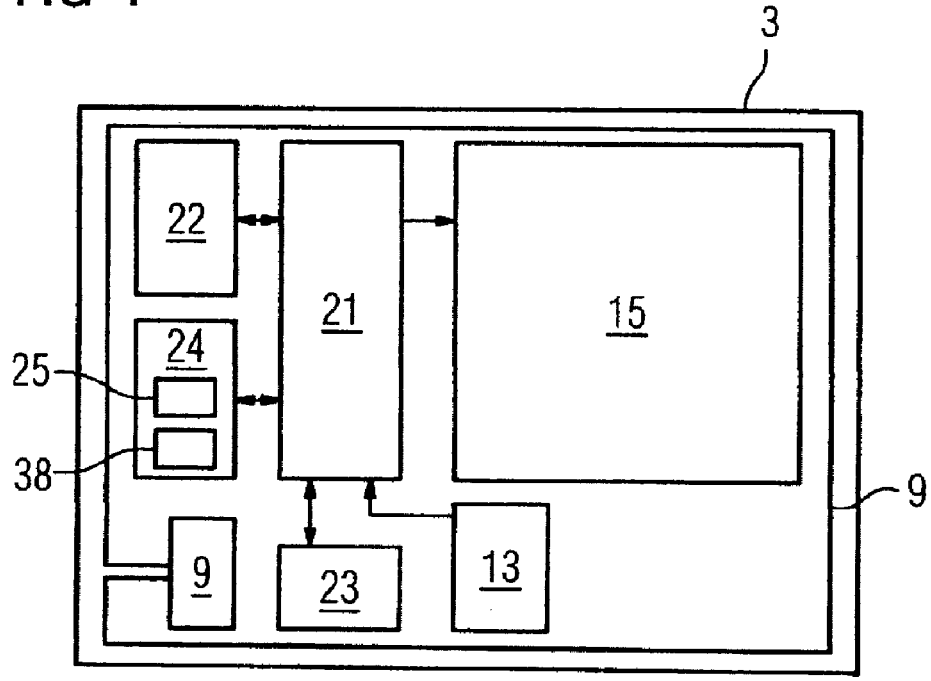
FIG. 4 shows a block diagram of a design element.

A schematic diagram of a design element 3 is shown in FIG. 4. The design element 3 has a control unit 21, which is connected both to the display unit 15 and the touch-sensitive element 13. Connected to the control unit 21 are an image storage unit 22 and a communication unit 23 for high-frequency data transmission. An identification unit 24 is also connected to the control unit 21. The identifier "XYZ" of the design element 3 is stored in the identification unit 24, for example in the form of a data record in a data storage unit 25. The electric line arrangement 9 is used for the inductive power supply to all components of the design element 3.

Figure 5:
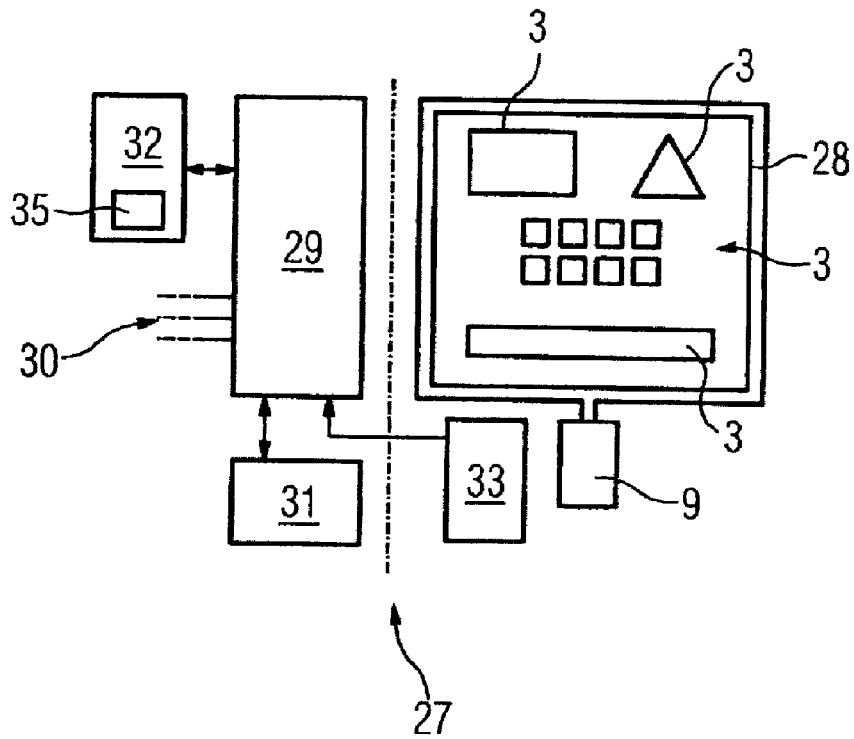
FIG. 5 shows a schematic diagram of a device with a control panel, control module and communication module.

FIG. 5 shows a schematic diagram of an operating unit 27 of an automation device (not shown). The operating unit 27 thereby comprises a control panel 28 and further components required to operate the control panel 28. These components are in particular a control module 29, connected by way of address, data and control lines 30 (for example by way of a profibus connection) to the outside world, for example a computer network or a control unit of an automation device, etc. (not shown) and serving to activate the control panel 28. A further component is a communication module 31, which is provided to provide data communication with the communication units 23 of the individual design elements 3 and for high-frequency data transmission. The communication module 31 can be integrated in the control module 29 or be configured separately.

The control panel 28, on which various design elements are disposed, some individually some in groups, is provided with a line arrangement 9 enclosing the entire control panel, used for the inductive power supply to the design elements 3 disposed on the control panel 28. The contactless transmission method known from RFID (Radio Frequency Identification) and based on electromagnetic alternating fields is used to supply power. This technology has the advantage that it can be executed as printable electronic components like all the other components.

The wireless data transmission between the control module 29 and control panel 28 using high-frequency technology means that these components can be disposed at a distance from each other. It is therefore possible for the control panel 28 of the operating unit 27 to be positioned on an easily accessibly upper side of an automation device, while the control module 29 and other components of the operating unit 27 are mounted on a less easily accessible rear side. FIG. 5 symbolizes this separate arrangement with a dot/dash line.

The control module 29 is also connected to a storage module 32, serving to store configuration data, in particular in the form of a configuration table. A touch-sensitive element 33 is also provided, which is connected to the control module 29 and serves to control the control module 29, in particular during a configuration method. Control module 29, communication module 32 and storage module 31 are preferably configured as parts of a computer system, on which a computer program runs, which is configured to execute all the processes relating to initialization, configuration and operation of the control panel.

Figure 6:
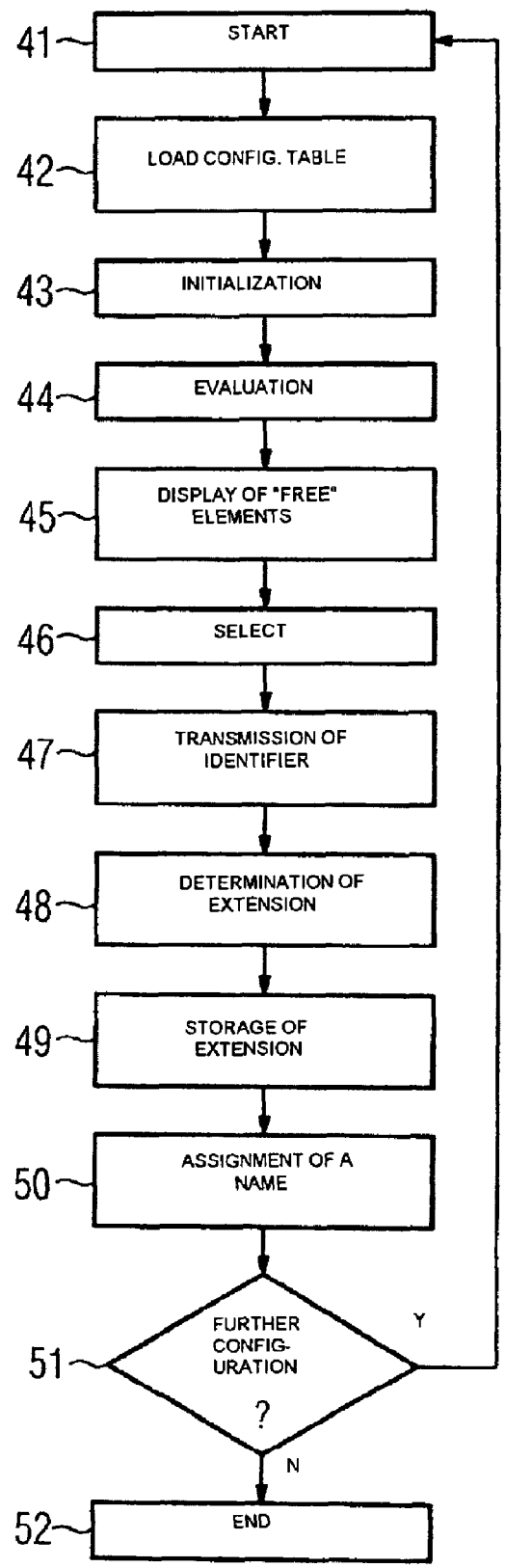
FIG. 6 shows a simplified flow diagram of the configuration method.

Once the various design elements 3 (display or, respectively, operating elements) have been removed from the rolls or webs 1 and have been positioned in the control panel 28 according to the specific requirements of the operating unit 27 or the application, configuration of the control panel 28 takes place, with information being determined about the design elements 3 present and being stored in a configuration table 35 in the operating unit 27. FIG. 7 shows exemplary diagrams of the control panel 28 and the configuration table 35, while FIG. 6 shows the individual steps of the configuration method.

In a first step 41 the configuration method is started by two touches on the operating element 33 configured as the "reset" button on the control module 29. In a second step 42 the configuration table 35 is loaded into the control module 29 from the storage module 32. If there is no configuration table stored there as yet, one is now created.

At the same time initialization takes place of all design elements 3 disposed on the control panel 28 by means of an initialization process, wherein all the design elements 3 are addressed with the aid of an initialization current surge initialized by the control module 29 and detected on acknowledgement (step 43). It is thereby ensured, by an appropriate arrangement of components, that only the control panel 28 associated with the control module 29 is included in the initialization, while other control panels, possibly present in the closer environment, are not addressed.

An evaluation of the information contained in the configuration table 35 and a comparison with the information obtained from the initialization (step 44) are followed by a display, for example of the form "Name?", on those design elements 3, which have not yet been configured (step 45). FIG. 7 shows a control panel 28 in this situation with the associated configuration table 35. The design element "Name1" is already configured. The configuration table 35 has the corresponding inputs for identifiers 36 and extensions 37.

A specific design element 3 is then selected (step 46) by simply touching the touch-sensitive element 13 ("Set") of the design element (marked "R" in FIG. 7). In the next steps 47, 48 the identifier 36 of the selected design element 3 is transmitted to the control module 29 and a free extension 37 is determined. The extension 37 ensures that each design element 3 can be uniquely identified in the address system used. If for example design elements with the same identifiers 36 but from different webs 1 are used on a control panel 28, these two design elements are distinguished by the extension 37. The extension 37 is preferably determined using the identifier 36 of the individual design element in conjunction with the selection information generated by pressing the touch-sensitive element 13.

The extension 37 is then input into the configuration table 35 and transmitted back to the design element 3, where it is stored in the identification unit 24, for example in a PROM 38 (step 49), see also FIG. 4. Compared with the alternative of storing the extension 37 solely in the configuration table 35, the additional storage in the design element 3 facilitates further data processing.

Once the extension 37 has been assigned, a name 39 is allocated to the design element 3 and the new name is input into the configuration table 35 (step 50). In the second control panel 28' shown in FIG. 7 the design element "Name2" is already configured. Configuration of the design elements "Name3", "Name4" and "Name5" now takes place. These three design elements 3 are configured with the aid of an activatable macrofunction provided by the control module 29, in such a manner that all the design elements 3 not yet configured are automatically configured one after the other, without requiring further manual confirmation of the configuration process by activating a "Set" or "Reset" key. The second configuration table 35' shows a snapshot, wherein it is determined that the design element with the identifier 36 "301" is already present and "Name2" has been allocated for the design element "Name2". The extension "01" is then created and the designation "Name5" is assigned to the design element with the identifier "301" and the extension "01". During the further course of the configuration the designation "Name4" is assigned to a first design element with the identifier "302". For a further design element ("Name3") with the identifier "302" unique addressing is enabled by assigning the extension "01". The extension "00" or no extension at all is preferably assigned automatically to design elements with unique identifiers (in the example the design element "Name1").

If the configuration method is to be continued, a further design element 3 can be selected (step 51). Otherwise the configuration table 35 is stored and the configuration method is terminated (step 52). The third control panel 28" in FIG. 7 represents a state, wherein all the design elements 3 have already been configured and are therefore ready to use. The configuration information is shown in the third configuration table 35".

If a number of connected design elements 3 are removed in a group from the carrier film 2 and disposed on the control panel 28, simplified configuration preferably takes place. Since, because of their original position on the carrier film 2, the design elements have consecutive line/column numbers in their identifier 36 and identical function codes, it is only necessary to configure one of said design elements 3. Since it is clear after initialization and evaluation (steps 43 and 44) whether connected design elements are present, it is thus possible to assign the control panel functionalities to be generated automatically to the previously found design elements. There is then no need for the time and cost-intensive individual configuration of all the design elements. If for example a six-part seven-segment display is provided for the control panel 28, six connected seven-segment-display design elements can be removed from a corresponding carrier film and disposed on the control panel. After the acknowledgement from all six design elements during initialization, it is then sufficient to configure one of the six design elements, this being started for example by touching the touch-sensitive element 13, to configure the further five design elements automatically at the same time. In other words the control module 29 automatically identifies that five further identical and connected design elements are present and carries out the configuration, including the inclusion of said design elements in the address system (steps 47 to 50). As a result the control module 29 knows the connected arrangement of the six seven-segment-display design elements on the control panel 28, such that activation of the six-part seven-segment display is possible.

In a further embodiment of the invention no design elements are removed from the carrier film 2, rather the entire carrier film 2 or a fairly large cohesive part thereof is positioned on the control panel 28. Depending on which control panel functionalities are provided, the control module 29 then searches out the required design elements during configuration, while the design elements that are not required remain unused.

The invention claimed is:

1. A design element, which in combination with other design elements constitutes a human-machine interface for an automation device, comprising:
   a display unit;
   a touch-sensitive element;
   a control unit coupled to the display unit and the touch-sensitive element;
   an identification unit to identify the design element based upon an identifier;
   a communication unit to transmit data between the design element and the automation device;
   a control panel, wherein the design element is physically connected to at least some of the other design elements to form a connected group of design elements, wherein the connected design element group can be freely repositioned from a first position on a surface of the control panel to a second position on the surface of the control panel to reconfigure a layout of the human-machine interface;
   a control module to activate the design elements and assign a respective operational functionality to the design elements, wherein a temporally concurrent activation and assignment of a common operational functionality of all the design elements of the connected group is automatically performed by the control module based on an identification by the control module of just one of the design elements of the connected group, the temporally concurrent activation and assignment configured to avoid individualized activation and assignment of the control functionality of all the design elements of the connected group; and
   a communication module to transmit data between the control module and the design element, wherein the design element is disposed on the control panel of the automation device and is responsive to said control module, which in combination with the control panel, comprises an operating unit for the automation device, and further wherein the control panel and the control module are spaced apart from one another and mounted on different sides of the automation device.

2. The design element as claimed in claim 1, further comprising a storage unit to store display data.

3. The design element as claimed in claim 1, further comprising a contactless power supply.

4. The design element as claimed in claim 3, wherein the communication unit is configured to provide a contactless data transmission.

5. The design element as claimed in claim 4, wherein a common transmission link for a combined power and data transmission is provided.

6. The design element as claimed in claim 4, wherein the design element is based on a polymer electronic.

7. The design element as claimed in claim 6, wherein the design element is attached to a attachment device being a roll or web, wherein the attachment device has a carrier film with design elements printed based on a polymer electronic technique and disposed in lines and columns.

8. The design element as claimed in claim 7, wherein the individual design elements are horizontally and vertically disposed.

9. The design element as claimed in claim 8, wherein the design elements are separated based upon prepunched lines or cutting lines to remove the design elements from the carrier film individually or in groups.

10. The design element as claimed in claim 1, further comprising:
    a rear cover having an adhesive component to attach the design element to the control panel,
    a layer structure, having:
    the touch-sensitive element above the rear cover, and
    a layer-type display unit covering the touch-sensitive element having a plurality of organic light-emitting diodes,
    a transparent front cover to seal a side of the design element so that light emitted from the display unit penetrates.

11. An automation device, comprising:
    a plurality of design elements arranged to form a human machine interface for the automation device, having:
    a display unit,
    a touch-sensitive element,
    a control unit coupled to the display unit and the touch-sensitive element,
    an identification unit to identify the design element based upon an identifier, and
    a communication unit to transmit data between the respective design element and the automation device;
    at least some of the design elements physically connected to one another to form a connected group of design elements, the connected group of design elements being freely repositioned from a first position on a surface of a control panel to a second position on the surface of the control panel to reconfigure a layout of the human-machine interface;
    a control module to activate the design elements and assign a respective operational functionality to the design elements, wherein a temporally concurrent activation and assignment of a common operational functionality of all the design elements of the connected group is automatically performed by the control module based on an identification by the control module of just one of the design elements of the connected group, the temporally concurrent activation and assignment configured to avoid individualized activation and assignment of the control functionality of all the design elements of the connected group; and
    a communication module to transmit data between the control module and the design elements, wherein the control panel and the control module comprise an operating unit for the automation device, and further wherein the control panel and the control module are spaced apart from one another and mounted on different sides of the automation device.

12. The automation device as claimed in claim 11, further comprising a storage module for storing configuration data.

13. The automation device as claimed in claim 11, further comprising a power supply module to provide a contactless power supply to the design element.

14. The automation device as claimed in claim 11, wherein a contactless data transmission is provided in a communication module.

15. A method for configuring an automation device, comprising:
    providing a plurality of design elements arranged to form a human machine interface for the automation device, having:
    a display unit,
    a touch-sensitive element,
    a control unit coupled to the display unit and the touch-sensitive element, and an identification unit to identify the design element based upon an identifier;
providing a communication unit to transmit data between the design element and the automation device;
physically connecting at least some of the design elements to one another to form a connected group of design elements;
providing a control panel to position the design elements freely;
repositioning the connected group of design elements from a first position on a surface of the control panel to a second position on the surface of the control panel to reconfigure a layout of the human-machine interface;
activating and assigning with a control module a respective operational functionality to the design elements;
automatically performing with the control module a temporally concurrent activation and assignment of a common operational functionality of all the design elements of the connected group based on an identifying by the control module of just one of the design elements of the connected group, the temporally concurrent activation and assignment configured to avoid individualized activation and assignment of the control functionality of all the design elements of the connected group;
providing a communication module to transmit data between the control module and the design elements;
forming with the control panel and the control module an operating unit for the automation device; and
arranging the control panel and the control module to be spaced apart from one another and mounted on different sides of the automation device.

* * * * *